Figure 1:
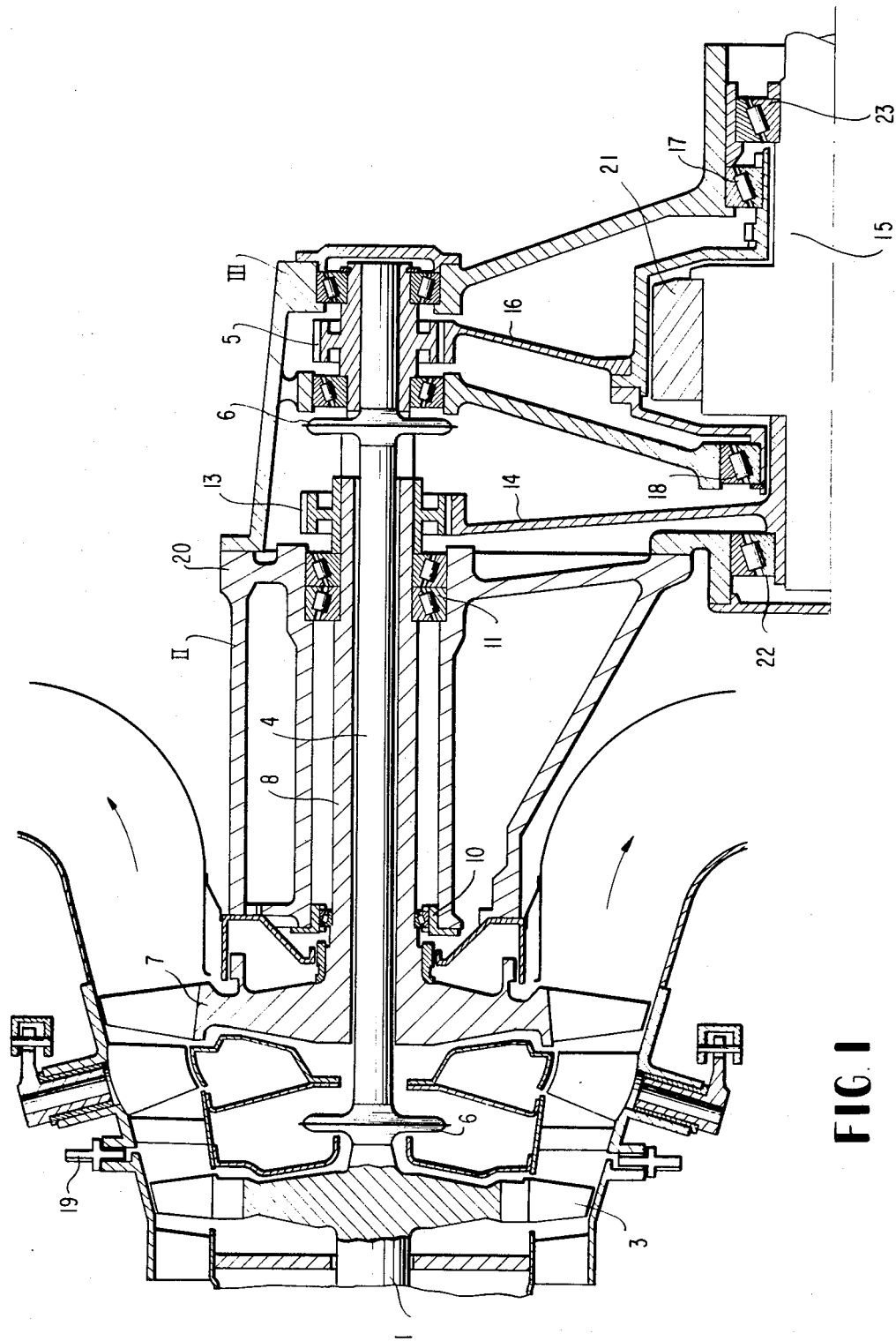

United States Patent
Hagemeister

[15] 3,703,076
[45] Nov. 21, 1972

[54] TWIN SHAFT GAS TURBINE ENGINE
[72] Inventor: Klaus Hagemeister, Munich, Germany
[73] Assignee: Motoren-Und Turbinen-Union Muenchen GmbH, Munich, Germany
[22] Filed: June 5, 1970
[21] Appl. No.: 43,778

[30] Foreign Application Priority Data
June 6, 1969 Germany..........P 19 28 660.3

[52] U.S. Cl..................................60/39.16, 64/13
[51] Int. Cl................................................F02c 3/10
[58] Field of Search........60/39.16; 287/85; 285/225; 64/13

[56] References Cited

UNITED STATES PATENTS

| | | |
|---|---|---|
| 3,481,145 | 12/1969 | Oldfield................60/39.16 X |
| 2,158,890 | 5/1939 | Antelme...................287/85 R |
| 2,944,844 | 7/1960 | Miller.......................287/85 R |
| 1,190,716 | 7/1916 | Bowmann..............285/225 X |
| 3,507,113 | 4/1970 | Herrmann................60/39.16 |
| 3,546,879 | 12/1970 | Hass.........................60/39.16 |

*Primary Examiner*—Carlton R. Croyle
*Assistant Examiner*—Robert E. Garrett
*Attorney*—Craig, Antonelli & Hill

[57] ABSTRACT

A twin-shaft gas turbine engine, which includes a gas generator with compressor and compressor turbine, a power turbine and a transmission, and in which, for purposes of braking operation, an intermediate shaft extends through the hollow power turbine output shaft to connect the rotor of the gas generator with the transmission; an engageable clutch associated with the intermediate shaft permits selective operation.

21 Claims, 2 Drawing Figures

TWIN SHAFT GAS TURBINE ENGINE

This invention relates to a twin-shaft gas turbine engine, comprising a gas generator with a compressor and an associated compressor-turbine, an independently operating power turbine and a main gearbox or transmission, with the gas generator, the power turbine, and the gearbox arranged coaxially in line or in series.

It is known, when using an engine of the above type as a prime mover for vehicles, that the compressor can be employed for braking. This requires a mechanical connection between the main gearbox and the gas generator rotor. In the systems of the prior art, an auxiliary shaft and an engageable clutch are provided alongside the entire proper which, however, results in several disadvantages, the main disadvantages being that a gearbox or transmission has to be provided at the gas generator for the connection with the auxiliary shaft and that the laterally arranged shaft results in limitations for the arrangement of casings and housing for auxiliaries, gas ducts and heat-exchangers and that the assembly of the power plant becomes complicated. Moreover, the manufacturing costs of such an arrangement are relatively high.

The object of the present invention is to provide a mechanical connection between the gas generator and the main gearbox which avoids the aforementioned disadvantages.

As a solution to the underlying problem, it is proposed according to the invention, for the purpose of enabling a braking operation, to arrange an intermediate shaft extending from the rotor of the gas generator coaxially through the hollow shaft of the power turbine to the main gearbox and to provide a clutch or a gearbox with a clutch for connecting the two sections or units.

The arrangement according to this invention not only eliminates the above disadvantages of the hitherto known solutions, but, moreover, provides for a favorable construction and configuration of the engine since the gas generator, the power turbine and the gearbox form complete and independent structural units which are fitted together by large diameter spigot or centering flanges.

This arrangement, in turn, entails the advantage that each of the three components or structural groups can be manufactured independently, where in particular the rotors of the gas generator and of the power turbine can be balanced in their bearings prior to engine final assembly. Moreover, such a construction results in the advantages for maintenance and repair, inherent in the use of completely preassembled components or structural groups.

According to another feature of the present invention, the intermediate shaft is coupled to the gas generator rotor and the gearbox or the clutch, respectively, by way of a flexible diaphragm. These diaphragms essentially consist of two flange-type discs of relatively large diameter as compared to the shaft, and are provided with hubs, whereby the discs are rigidly connected to each other at their outer rims. The ends of the two shafts to be connected extend into the hubs of the diaphragms where they are restrained against rotation. This construction provides high torsional rigidity, while bending moments result in a relatively large elastic deformation. These diaphragms serve the compensation of any misalignments between the gas generator and the gear or transmission shaft. They are of simple design and are not subjected to wear like known positive connections such as curvic couplings. Another advantage of the above-described flexible diaphragms is, that due to their great radial rigidity, a good centering of the intermediate shaft can be accomplished.

Figure 2:
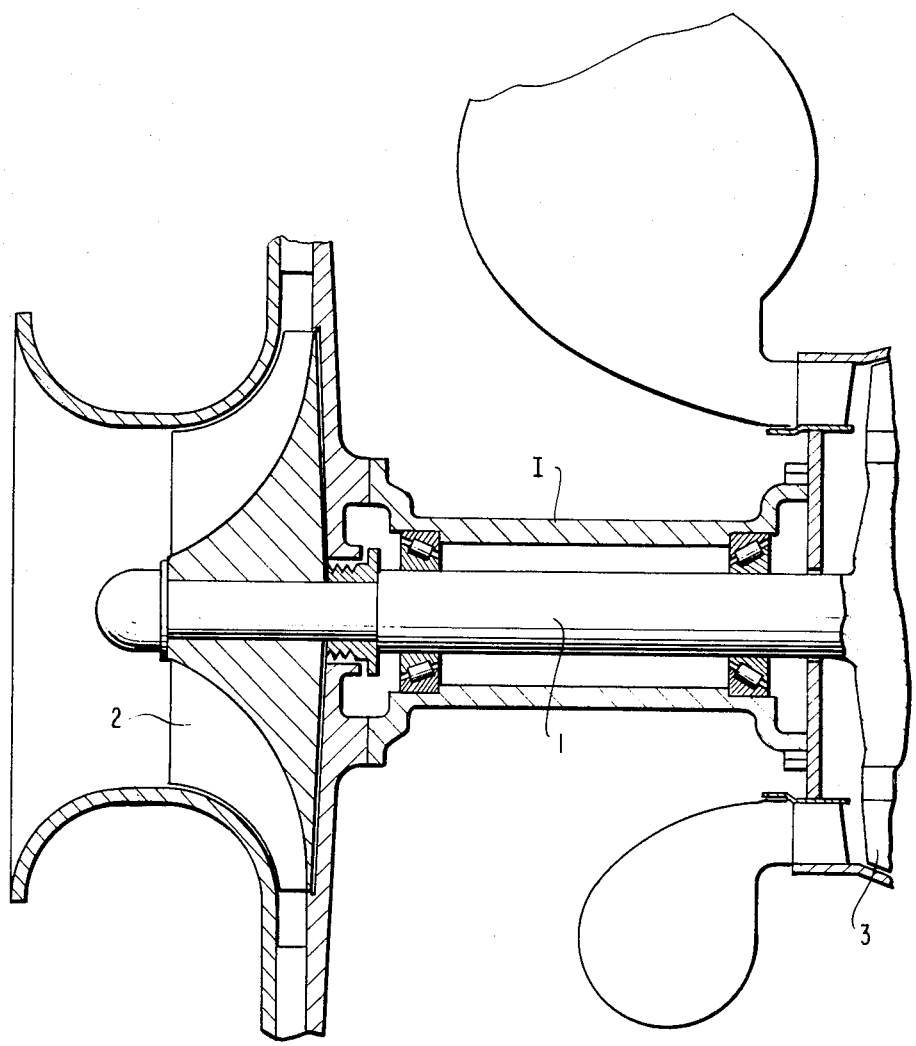

These and further objects, features and advantages of the present invention will become more obvious from the following description when taken in connection with the accompanying drawing which shows, for purposes of illustration only, one embodiment of a drive unit in accordance with the present invention, and wherein:

FIG. 1 is a partial longitudinal, axial cross-sectional view of one embodiment of a drive unit in accordance with the present invention, illustrating the rear section thereof which includes the power turbine II and the transmission III connected thereof; and FIG. 2 is a partial longitudinal axial cross-sectional view of the drive unit of FIG. 1 and illustrating the front section thereof including the gas generator I, the drive unit being divided into these two figures approximately in the center for reasons of lack of space, thus requiring FIG. 2 to be added to the left end of FIG. 1 to complete the unit.

Referring now to the drawing wherein like reference numerals are used throughout the two views to designate like parts, the gas generator I, the power turbine II, and the main gearbox or transmission III are mounted in line and are connected to each other by means of centering flanges 19, 20. The gas generator rotor 1 consists of a compressor rotor 2, of a turbine wheel 3 and of a common shaft, and is connected to the gearbox III through an intermediate shaft 4 which extends through the hollow shaft 8 of the power turbine rotor 7.

On the gearbox end, the shaft 4 drives a pinion 5. For compensating any misalignment between the gas generator rotor 1 and the axle of the pinion 5, the intermediate shaft 4 is connected to both ends by way of elastic diaphragms 6 allowing the required compensating movements. Due to the great radial rigidity of diaphragm 6, the center position of the intermediate shaft 4 is effectively maintained.

In the case considered, the rotor of the power turbine II includes a turbine wheel 7 with a welded-on hollow shaft 8 which is supported by bearings 10 and 11. On the gearbox end of the power turbine II, the rotor is provided with an output pinion 13.

The transmission or gearbox III includes a section for positive or output power and a second for negative or braking power, the two sections being arranged coaxially with the output shaft 15 which, however, is not essential to the present invention. The output shaft 15 is supported by bearings 22, 23 in the housing of the gearbox III. In the positive power section, the pinion 13 drives the output shaft 15 by way of a large diameter gear 14. In the negative power section, the pinion 5 drives the large diameter wheel 16 rotating in its bearings 17, 18 independently of the output shaft 15. By means of the clutch 21, the two gear trains can be engaged with each other or disengaged so that either positive power or negative power can be supplied by the gas generator I to the output shaft 15 of the engine.

When positive power is transmitted from the power turbine 7 to the gearbox or transmission II, clutch 21 is disengaged so that the power flow from the shaft 8 of the power turbine 7 to the output shaft 15 is through pinion 13 and gear 14 only.

When braking power is to be transmitted from the gear box or transmission II to the gas generator I, clutch 21 is engaged so that the output shaft 15 of the gearbox III is connected to the rotor 1 of the gas generator I by way of gear 16, pinion 5 and shaft 4.

While I have shown and described only one embodiment in accordance with the present invention, it is understood that the same is not limited thereto but is susceptible of numerous changes and modifications known to those skilled in the art, and I therefore do not wish to be limited to the details shown and described herein but intend to cover all such changes and modifications as are encompassed by the scope of the appended claims.

I claim:

1. A twin-shaft gas turbine engine, which includes a gas generator with a compressor and an associated turbine, an independently rotating power turbine for driving a power output means and a transmission, characterized by an intermediate shaft and associated engageable means, said intermediate shaft extending from the rotor of said gas generator substantially coaxially through a hollow power turbine shaft to said transmission to enable a braking operation of said power output means on engagement of said engageable means, wherein said gas generator, said power turbine and said transmission form subassembled structural units which are connected to each other at large diameter centering flange means and wherein said intermediate shaft is operatively connected with said gas generator rotor by flexible diaphragm means.

2. A gas turbine engine according to claim 1, wherein said intermediate shaft is operatively connected with said transmission by flexible diaphragm means.

3. A gas turbine engine according to claim 2, wherein said gas generator, said power turbine and said transmission are arranged coaxially one behind the other.

4. A gas turbine according to claim 3, wherein said transmission is the main gearbox.

5. A gas turbine according to claim 2, wherein said engageable means includes a clutch.

6. A gas turbine according to claim 2, wherein said engageable means includes gear means with an intermediate clutch.

7. A twin-shaft gas turbine engine, which includes a gas generator with a compressor and an associated turbine, an independently rotating power turbine for driving a power output means and a transmission, characterized by an intermediate shaft and associated engageable means, said intermediate shaft extending from the rotor of said gas generator substantially coaxially through a hollow power turbine shaft to said transmission to enable a braking operation of said power output means on engagement of said engageable means, wherein said intermediate shaft is operatively connected with said gas generator rotor by flexible diaphragm means.

8. A gas turbine engine according to claim 7, wherein said intermediate shaft is operatively connected with said transmission by flexible diaphragm means.

9. A twin-shaft gas turbine engine comprising a gas generator with a generator turbine, a rotating power turbine arranged coaxially behind the generator turbine, a hollow power turbine shaft having a first forward end fixedly connected to said power turbine and a second rearward end connected to power driving means, said power driving means being operable to drive an engine output shaft upon rotation of the power turbine, and a generator turbine shaft extending completely through the hollow power turbine shaft and being freely rotatable with respect to said hollow turbine shaft, said generator turbine shaft having a first forward end connected to said generator turbine and a second rearward end connected to a selectively engageable coupling means for selectively operatively connecting said generator turbine shaft to said engine output shaft for applying braking forces from the generator turbine shaft to the engine output shaft, wherein said coupling means operatively engages said output shaft at a position separate from the engagement between said power driving means and said output shaft, and wherein said generator turbine shaft is operatively connected at its first end with said generator turbine and at its second end with said coupling means with respective first and second flexible diaphragm means.

10. A twin-shaft gas turbine engine comprising a gas generator with a generator turbine, a rotating power turbine arranged coaxially behind the generator turbine, a hollow power turbine shaft having a first forward end fixedly connected to said power turbine and a second rearward end connected to power driving means, said power driving means being operable to drive an engine output shaft upon rotation of the power turbine, and a generator turbine shaft extending completely through the hollow power turbine shaft and being freely rotatable with respect to said hollow turbine shaft, said generator turbine shaft having a first forward end connected to said generator turbine and a second rearward end connected to a selectively engageable coupling means for selectively operatively connecting said generator turbine shaft to said engine output shaft for applying braking forces from the generator turbine shaft to the engine output shaft, wherein said coupling means operatively engages said output shaft at a position separate from the engagement between said power driving means and said output shaft, wherein said selectively engageable coupling means includes a first pinion fixed to the circumference of an axially extending extension of said turbine generator shaft, a first gear operatively engaged with said pinion, and a clutch for selectively operatively connecting said first gear to said output shaft, and wherein said axially extending extension is disposed rearwardly of a flexible diaphragm means connecting said extension to said generator turbine shaft, and wherein bearing means are provided for rotatably supporting said extension such that said generator turbine shaft is out of contact with the hollow interior surface of said hollow shaft at all times.

11. A gas turbine engine according to claim 9, wherein each of said diaphragm means has a diameter substantially larger than the hollow opening in said hollow shaft, said first diaphragm being spaced forwardly from the first end of said hollow shaft and said second diaphragm being spaced rearwardly from the second end of said hollow shaft.

12. A gas turbine engine according to claim 9, wherein each of said diaphragm means comprises two radially rigid disc connected at their respective peripheries to one another, shaft means being connected to center portions of said disc.

13. A gas turbine engine according to claim 7, wherein said gas generator, said power turbine, and said transmission are arranged coaxially one behind the other.

14. A gas turbine engine according to claim 7, wherein said transmission is the main gear box.

15. A gas turbine engine according to claim 7, wherein said engageable means includes a clutch.

16. A gas turbine engine according to claim 7, wherein said engageable means includes gear means with an interconnected clutch.

17. A gas turbine engine according to claim 7, wherein said power output means includes an engine output shaft drivingly engageable with said power turbine shaft, wherein said engageable means includes selectively operative coupling means for selectively operatively connecting said intermediate shaft to said output shaft, and wherein said coupling means operatively engages said output shaft at a position separate from the engagement between said power driving means and said output shaft.

18. A gas turbine engine according to claim 17, wherein said power output means includes a pinion fixedly attached to the circumference of said hollow power turbine shaft in engagement with a gear fixed to said output shaft.

19. A gas turbine engine according to claim 17, wherein said selectively engageable coupling means includes a first pinion fixed to the circumference of an axially extending extension of said intermediate shaft, a first gear operatively engaged with said pinion, and a clutch for selectively operatively connecting said first gear to said output shaft.

20. A gas turbine engine according to claim 19, wherein said output means includes a second pinion fixed to the circumference of said hollow power turbine shaft in engagement with a second gear fixed to said output shaft.

21. A gas turbine engine according to claim 20, wherein said first and second gears are axially spaced along said output shaft.

* * * * *